TAPE GUIDE AND REEL HUB CONSTRUCTION FOR COAXIAL REEL TYPE TAPE RECORDER OR REPRODUCER

Filed March 28, 1956 2 Sheets-Sheet 1

Inventors
Anthony Flan
Harold N. Miller
Fred Lindroos
By George E. Frost
Attorney Inventors
Anthony Flan
Harold N. Miller
Fred Lindroos
By George E. Frost
Attorney 3,002,706

TAPE GUIDE AND REEL HUB CONSTRUCTION FOR COAXIAL REEL TYPE TAPE RECORDER OR REPRODUCER

Anthony Flan, Evanston, Ill. (2033 Glen Oak Drive, Glenview, Ill.), Harold N. Miller, Glencoe, and Fred Lindroos, Fox Lake, Ill.; said Miller and said Lindroos assignors to said Flan
Filed Mar. 28, 1956, Ser. No. 574,473
3 Claims. (Cl. 242—68.3)

Our invention relates to improvements in the coaxial mounting of the two reels of a tape recorder or reproducer and to improved means for guiding the tape from one reel to the other.

The coaxial mounting of the two reels of a tape recorder or reproducer offers many advantages over a mounting of the reels on separate axes in a single plane. The chief advantage of the coaxial mounting is, of course, the reduced space required on the surface of the machine to accommodate the reels. This permits considerable economy in the construction of the recorder and leads to a desirable compactness of design. For example, with a pair of coaxial 14 inch reels it is possible to provide a 12 hour total program time in a machine having its greatest dimension of 20 inches.

However, with the reels in different planes on a single axis problems are encountered which are not found in a dual axis, co-planar reel installation. Guiding the tape from the plane of one reel to the plane of the other reel requires precision construction to accommodate the requisite flexure of the tape and at the same time guide the tape across the head in smooth uniform fashion. Also means must be provided to permit easy removal of the lower reel over the hub which sustains the upper reel.

When the two reels of a tape recorder or reproducer are mounted on a single axis the reels lie in different planes, one above the other, with each parallel to and above the plane of the surface of the machine. The tape must be guided from the plane of the payout reel to the plane of the take-up reel. This requires a series of guide rollers spaced at varying intervals between the two planes of the reels and hence spaced in varying distances from the surface of the machine. In addition, the guides, which are disk-shaped rollers, must be perfectly aligned so that they lie in the same plane as the path the tape should follow as it passes from one reel to the other. The path of the tape, of course, is at an angle from the plane of the reels and the plane of the recorder surface. Thus each disk-shaped roller guide must be at a different distance from the surface of the recorder; each must be tilted at an agle to the surface of the recorder; and each must be aligned with the other guides.

In the apparatus disclosed herein the guide rollers are all mounted on a panel, with their axes normal to the surface of the panel, and all equi-distant from the panel. The rollers are all aligned with each other in a plane parallel to the surface of the panel. The head or heads are similarly mounted on the panel in alignment with the rollers. The panel is then installed on the machine adjacent the reels at the angle required to guide the tape from one reel to the other.

In order for a coaxial mounting of the reel to be practical the lower reel must be readily removable from the recorder. At the same time, the reels should be of the same size so that they may be interchangeably used in either the upper or lower position. Thus the hubs that carry the reels must be of the same diameter. In the present invention the upper hub is so constructed that the lower reel can readily be slipped over it. This is accomplished by constructing the upper hub in three sections. A central base portion, which receives the reel drive shaft, carries two hinged wing sections. The wing sections are circular at their outer edges and have flanges to receive and carry the upper reel. After the upper reel has been removed the wing sections of the upper hub can be swung up so that the opening in the lower reel will readily clear the ends of the wing section. In use, the wing sections are folded flat to a position defining a mutilated flanged hub which serves to hold the upper reel effectively.

It is therefore a general object of the present invention to provide a simply constructed reliable guide mechanism for the tape on a tape recorder or reproducer having coaxially mounted reels.

It is yet another object of the present invention to provide a device to guide the tape of a tape recorder or reproducer from a pay-out reel in one plane to a take-up reel in another plane in which all rollers are aligned in a single plane and are readily and inexpensively located in the aligned positions.

It is still another object of the present invention to provide a device which will guide the tape of a tape recorder from a reel on one plane to a reel on another plane which utilizes the advantages of mounting all the guide rollers indentically on a single panel with their axes perpendicular to the panel.

It is yet another object of the present invention to provide a device on a tape recorder or reproducer having two similar reels coaxially mounted which permits easy removal of the lower reel.

It is still another object of the present invention to provide a foldable hub for the top reel of a tape recorder or reproducer having coaxially mounted reels to permit ready removal of the lower reel.

It is yet another object of the present invention to provide an upper hub for a tape recorder or reproducer having coaxially mounted reels which, with the upper reel removed, can be folded upward to allow a lower reel with the same dimensions as the upper reel to be removed from the recorder.

It is a further object of the present invention to provide a two-position upper hub for a tape recorder or reproducer which carries the upper reel when in one position and permits easy removal of the lower reel when in the other position.

It is yet another object of the present invention to provide a tape recorder or reproducer that is of simple construction, easy to operate, inexpensive, and with a high degree of utility.

The novel features which we believe to be characteristic of our invention are set forth with particularity in the appended claims. Our invention itself, however, both as to its organization and method of operation, together with further objects and advantages thereof, will best be understood by reference to the following description taken in conjunction with the accompanying drawings in which:

Figures 1, 2, 3, 4, 5, 6:
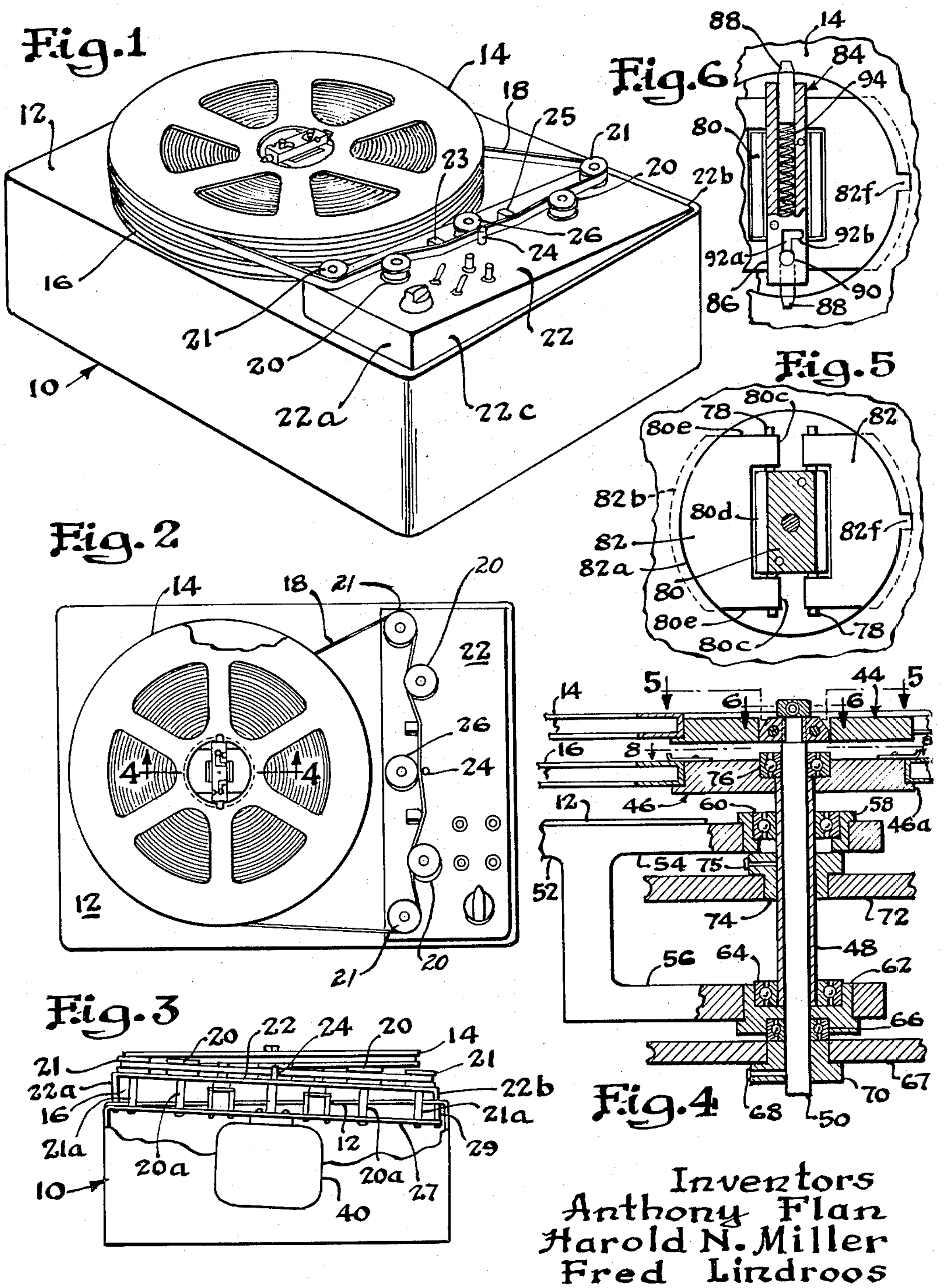
FIGURE 1 is a perspective view of a tape recorder having coaxially mounted reels constructed in accordance with the present invention.
FIGURE 2 is a top plan view of the tape recorder of FIGURE 1.
FIGURE 3 is a side elevational view, with parts broken away, of the tape recorder of FIGURE 1.
FIGURE 4 is a cross-sectional view through section 4—4 of FIGURE 2 showing the coaxial reel hubs carrying the mounted reels.
FIGURE 5 is a view through section 5—5 of FIGURE 4 showing a top plan view of the foldable upper hub.
FIGURE 6 is a view through section 6—6 of FIGURE 4 showing the spring detent means retaining the upper reel on the upper hub.

A tape recorder or reproducer incorporating the present invention is shown in perspective in FIGURE 1. The machine case, shown generally at 10, is of generally rectangular shape and has a top surface 12. An upper reel 14 is mounted above, and coaxially with, a lower reel 16. As hereinafter described these reels act alternately as take-up and pay-out reels. The two reels lie in different planes parallel to each other and to the top surface 12 of the machine case.

The reels carry a magnetic tape 18 which can be magnetized so that its upper half carries a recording independent of a recording on its lower half. The tape, as it passes from one reel to the other, passes across two heads 23 and 25. The heads, of the conventional type, magnetize the tape as it passes over the surface when the machine is being used as a recorder. When the machine is being used as a reproducer the pickup head responds to the varying magnetization of the tape as it travels thereover to produce a time-varying signal like that initially recorded. One head is constructed to respond to the magnetization along a channel on the top half of the tape and the other responds to the magnetization along a channel on the bottom half of the tape. The heads are used alternately as described hereafter.

The two reels 14 and 16 are driven yieldably in the take-up direction by electric motors (not shown). A capstan 24, located between the two heads, drives the tape at predetermined velocity to feed from one reel to the other. This drive is sufficiently positive (by means of the pinch roller 26) to overcome the torque tending to drive the pay-out reel in the take-up direction.

Operation of the machine is commenced with one reel 14 full and the other reel 16 empty. The tape is threaded through rollers 20 and 21 across the heads 23 and 25 and the capstan 24 to the empty reel 16. The head 23, which may, for example, be responsive to magnetization of the upper half of the tape, is electrically connected in circuit (not shown). The capstan and reel drives are turned on and the tape feeds at a constant velocity from the pay-out reel 14 to the take-up reel 16. After the tape is completely transferred to the take-up reel 16 the machine is reversed. The capstan and the reels are then rotated in the opposite direction. The other head 25, which responds to magnetization of the lower half of the tape, is then connected in circuit in lieu of the head 23. It should be noted that play can be begun with either reel as the pay-out reel. Also either section of the tape 18 may be utilized for the initial portion of the operation.

Figure 7:
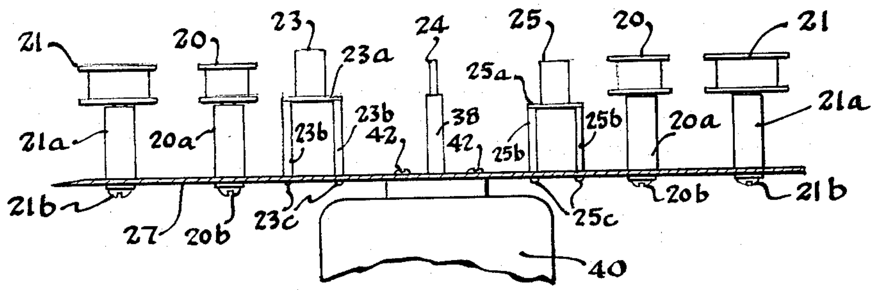
FIGURE 7 is an enlarged side view of the guide panel showing the roller guides mounted thereon.

The path of the tape 18 as it travels from the plane of the reel 16 to the plane of reel 14 is guided by a series of roller guides 20 and 21 mounted on an inclined guide panel 27, as shown in FIGURES 3 and 7. The panel 27 is mounted at an angle underneath the top surface 12 of the machine as shown in FIGURE 3. One end of panel 27 is fastened snugly against the surface 12. The roller guide 21 adjacent this end of the panel 27 is approximately aligned with upper reel 14. The other end of panel 27 is connected to a spacer block 29 positioned between panel 27 and the top surface 12. The size of the spacer block 29 is such that end roller 21 adjacent the spacer block will be approximately aligned with lower reel 16 (see FIGURES 1 and 3). A large opening in the top surface 12 permits the parts mounted on panel 27 to extend above the surface 12.

The rollers 20 and 21 are drum-shaped with outwardly extending flanges at their upper and lower surfaces. The two end rollers 21 are similar to the two inner rollers 20 but are larger to more readily accommodate the greater direction change of the tape as it passes over the end rollers. The rollers 20 and 21 are carried by posts *20a* and *21a* respectively. These posts are mounted normal to the panel 27 by means of screws, *20b* and *21b* respectively, threadedly received by the posts as shown in FIGURE 7. The rollers 20 and 21 each have a shaft which is rotatably received in a hole in the top of the post.

A cover plate 22 is mounted on the top side of surface 12 over the opening in surface 12. The cover plate 22 has side skirts *22a* and *22b* and end skirts *22c* as shown in FIGURE 1. The side skirt *22a* is longer than side skirt *22b* and the dimensions of these skirts are such that the top surface of plate 22 is parallel to panel 27, as shown in FIGURE 3. Openings in the cover plate 22 receive the parts mounted on the panel 27.

The two heads 23 and 25 are also installed on the panel 27 on either side of the capstan 24 and its coacting pinch roller 26. The heads 23 and 25 are mounted on platforms *23a* and *25a*, respectively. The platforms *23a* and *25a* are each supported by two posts, secured normal to the panel 27 by means of screws *23c* and *25c* as shown in FIGURE 7. The two posts *23b*, which carry the head 23 responsive to the upper half of the tape 18, are longer than the corresponding posts *25b* carrying the head responsive to the lower half of the tape. It should be noted that, if desired, the platforms *23a* and *25a* can be mounted on the posts so as to be adjustably tiltable to provide more sensitive adjustment of the contact of the heads to the tape.

Thus all the rollers 20 and 21 are simply installed with parts easily manufactured and with their axes normal to the panel. The rollers all lie in the same plane, parallel to the plane of panel 27. It can be readily seen that this installation reduces to a minimum the problems of alignment of rollers and adjustments of the rollers to a proper height. In addition proper alignment with the heads is easily accomplished in this simple installation.

Figure 10:
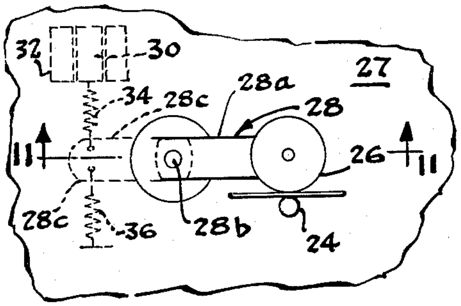
FIGURE 10 is a top plan vew of the guide panel showing the solenoid actuated pinch roller mechanism.
Figures 9, 11:
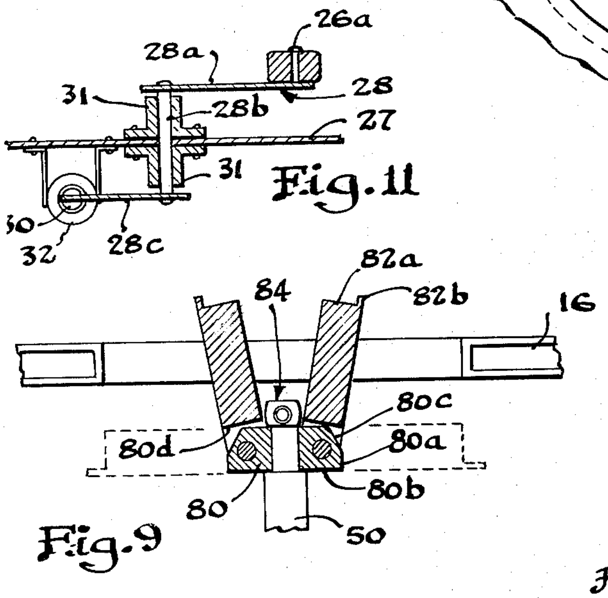
FIGURE 9 is a side elevational view of the upper foldable hub showing the hub in solid lines in the folded position and in dotted lines in the flat position, with the lower reel being removed.
FIGURE 11 is a view through section 11—11 of FIGURE 10.

The tape passes between a capstan 24 and a movable pinch roller 26, both of which are mounted on the guide panel 27. As shown in FIGURE 10 the pinch roller 26 is carried by a swingable crank 28 which is mounted on the guide panel 27. As shown in FIGURE 11, the crank 28 consists of an arm *28a* carried above panel 27 and parallel to it, a pivot shaft *28b* passing through panel 27 and normal to it, and arm *28c* carried below panel 27, parallel to it, and extending in the direction opposite arm *28a*. The pivot shaft *28b* is rotatably carried by two bearings 31 secured opposite each other to the upper and lower surfaces of panel 27. Pinch roller 26 is rotatably carried on a pin *26a* threadedly received in the outer end of arm *28a*. The outer end of arm *28c* is connected by means of a spring 34 to a solenoid plunger 30. The plunger is slideably received in solenoid 32 which is secured to the underside of panel 27 or some other suitable structure. Another spring 36, connected at one end to a fixed member of the recorder and at its other end to the swingable crank arm *28c* opposite the plunger spring 34, biases the crank arm *28c* away from the solenoid and pulls the solenoid plunger out of centered relation with the solenoid 32 as shown in FIGURE 10. Energization of solenoid 32 pulls the plunger into centered relation, against the bias of spring 36, to swing the movable crank arm *28c* and shift the position of the pinch roller 26. This movement of the roller 26 pinches the tape 18 between it and capstan 24.

The capstan 24 is a reduced section of the shaft 38 of capstan motor 40 as shown in FIGURE 7. The motor 40 is mounted by screws 42 to the underside of guide panel 27. The rotation of capstan 24 when the pinch roller 26 is engaged with the tape 18 feeds the tape from one reel to the other.

The upper and lower reels 14 and 16 are carried and rotated by the coaxially mounted hubs 44 and 46, respectively, as shown in FIGURE 4. A tubular shaft 48 is non-rotatably received in and drives the lower hub 46. Shaft 50, slideably received in tubular shaft 48, is non-rotatably received in, and drives, the upper hub 44. A forked bracket 52, with parallel arms 54 and 56 carries the shafts 48 and 50. The bracket 52 is affixed to the underside of top surface 12 of the recorder case with the arms parallel to the surface 12 and one of the arms 54 contiguous to the underside of that surface. Bushing 58 is snugly received in a hole in arm 54. A ball bearing 60 has an outer race snugly received by bushing 58 and an inner race which non-rotatably receives tubular shaft 48. Bushing 62 is similarly received in arm 56 and receives ball bearing 64 which carries tubular shaft 48. Shaft 48 terminates inside bushing 62 and its shank seats on the bottom of the hole which carries the bearing 64. The upper hub shaft 50, which is rotatably carried inside tubular shaft 48, extends beyond the end of shaft 48 through bushing 62. Ball bearing 66 is snugly fitted into bushing 62, opposite bearing 64, and the inner race of bearing 66 carries shaft 50.

A pulley 67 is non-rotatably received on hub 70 which is clamped, by means of set screw 68, to shaft 50 adjacent bearing 66. Pulley 72 is non-rotatably received on hub 74 which is clamped, by set screw 75, to the outer shaft 48. Pulley 72 is carried between arms 54 and 56 of bracket 52 adjacent bushing 58.

At its upper end tubular shaft 48 is non-rotatably received in and terminates in the lower reel hub 46. Shaft 50, carried in shaft 48, extends beyond the end of shaft 48. A ball bearing 76 is snugly received in hub 46 adjacent the shank of tubular shaft 48 and carries in its inner race shaft 50.

Figure 8:
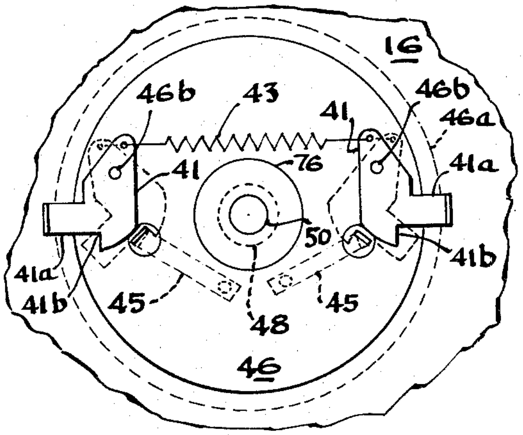
FIGURE 8 is a view through section 8—8 of FIGURE 4 showing the lower hub and the lower reel mounted thereon.

The lower hub 46 is disk-shaped and has a flange 46*a* encircling the hub at its lower edge, as shown in FIGURES 4 and 8. The inner circular opening of the reel 16 slideably fits over the hub and seats on flange 46*a* of the hub. Two locking plates 41 are swingably mounted on the upper surface of the lower hub 46 as shown in FIGURE 8. These locking plates each have an arm 41*a* and a notch 41*b*. A spring 43 extends between the two plates and connects to the plates at the end opposite the arms 41*a*. The plates each have a hole positioned between the point of attachment of spring 43 and the arm 41*a* which receives pin 46*b*. Pins 46*b* extend upwardly from the upper surface of hub 46 and provide the pivots around which the locking plates 41 swing. Two spring detents 45 are secured to the underside of hub 46 and extend up through holes in hub 46 to a position adjacent the locking plates.

The spring 43 biases the plates and causes them to swing into the locking position with the arms 41*a* extending outboard of the hub 46 to overlay the inner rim of the reel 16, as shown in solid lines in FIGURE 8. This locks the reel in place on the hub. When the locking plates are swung inboard to the position shown in the broken lines of FIGURE 8, the spring detent 45 engages the notch 41*b* in the locking plate 41. In this position the arms 41*a* are inboard of the outer periphery of hub 46 and the reel may be readily removed from the hub.

The upper hub 44 is shown in FIGURES 4, 5, 6 and 9. The hub 44 consists of a central base portion 80 and two wing sections 82. The base portion 80 is generally rectangular in shape but with the upper longitudinal edges beveled as shown in FIGURE 9. Thus the longitudinal sides of base portion 80 have a lower surface 80*a* normal to the bottom surface 80*b*. The upper portion 80*c* of the longitudinal side slopes inwardly. The central base portion 80 non-rotatably receives and is driven by the end portion of shaft 50.

Two parallel pins 78, lying in a plane normal to the drive shaft 50, pass longitudinally through the base portion 80 of the hub, one on each side of the shaft 50, as shown in FIGURE 5. Each of these pins extends beyond the central portion of the hub 80 at each end.

Each wing section 82 has a pair of arms 80*c* extending inboard of the inboard edge 80*d* of the wing section. These arms are spaced so as to span the base section 80. Each of these arms has a hole, coaxial with the holes carrying the longitudinal pins 78 passing through the base 80, which slideably receives the pin 78 when assembled. The inboard edge 80*d* of the wing section, extending between the extended arms 80*c*, is straight and snugly contacts the lower portion 80*a* of the longitudinal side of base portion 80 when the wing section is in the flat position to receive the reel. The contact between the wing section edge 80*d* and the side 80*a* of the base prevents the wing section from swinging below a flat horizontal position.

The outboard edge 82*a* of wing section 82 is circular and has a flange 82*b* extending outwardly from the lower surface of section 82. The radii of the outer edge and flange are the same as the corresponding radii on the lower hub 46. The sides 80*e* of the wing section normal to the inboard edge 80*d* are straight. The width of the wing section between sides 80*e* is less than the diameter of the reel carried by the hub.

The wing sections 82 are connected to central base portion 80 of the hub by means of the pins 78. These pins extend through the base portion 78 and the wing section arms 80*c* which straddle the base so that the wing sections are swingable in relation to the base about the axes of the pins. When the wings are down in the flat position the inboard edge of the wing section 80*d* is contiguous to, and held in the flat position by, the lower portion 80*a* of the side of the base section 80. Since the upper portion 80*c* of the side of the base section 80 slopes inwardly and upwardly, the wing section 82 can be swung upwardly without interference as shown in FIGURE 9.

When the wing sections 82 are in the flat position the upper reel 14 slideably fits over the upper hub 44 and is carried by the flanges 82*b* extending outwardly from the wing sections. When the upper reel 14 has been removed the wing sections can be folded upwardly. This swings the outer edges and flanges inboard. Since the width of the wing sections between sides 80*e* is less than the diameter of the opening in the reel carried, the lower reel, which is the same size as the upper reel, can be readily slipped over the folded upper hub assembly.

In order to retain the upper reel in position on the hub 44 a spring detent, shown generally at 84, FIGURE 6, is mounted on the central base portion 80 of the hub. This unit has a body 86 carrying slideably, at either end, detent pins 88. Each pin has a lug 90 which is received and slides in a slot 92 cut in the body 86. The slot has a section 92*a* running longitudinally to the body 86, and, at its inboard end, a transverse section 92*b*. A spring 94, inside the body 86, separates the two detent pins and biases them in the outboard direction. When the detent pin lug 90 is in the longitudinal section 92*a* of the slot the detent pins 88 are urged outward by the spring 94. In this position the pins 88 engage and overlay the upper surface of reel 14. When the lug 90 is pushed inboard into the transverse section 92*b* of the slot the detent pins 88 are disengaged from the reel, and the reel can be removed from the hub. In order to assure that the upper reel 14 will not slip on the upper hub 44, a lug 82*f* is located on the rim of one of the wing sections 82. This lug engages a mating slot on the reel.

While we have shown and described a specific embodiment of the present invention it will, of course, be understood that numerous modifications and alternative constructions may be made without departing from the true spirit and scope thereof. We therefore intend by the appended claims to cover all such modifications and alternative constructions as fall within their true spirit and scope.

What we claim as new and desire to secure by Letters Patent of the United States is:

1. A mechanism for removably mounting a pair of tape carrying reels having openings of like diameter on a pair of coaxial independently controlled shafts in which the outer shaft terminates short of the inner shaft, the mechanism comprising: a first hub received on the outer shaft, having a central cylindrical part to receive one reel and a flange below said cylindrical part to sustain said reel; a second hub mounted on the inner shaft above the first hub and in operative position defining a central part of part-cylindrical conformation with diametrically opposed relieved ends to receive the second reel and a flange below said central part to sustain the second reel, the second hub being of three-part construction including a base portion affixed to the inner shaft and of substantially smaller extent than the openings of the reels and a pair of parallel pins straddling said inner shaft extending between said relieved ends, respectively, and secured in the base portion and a pair of wings pivotally carried by said parallel pins, respectively, said wings defining said relieved ends and being swingable between positions in a common plane normal to said coaxial shafts to define the second hub in its operative position and positions in spaced parallel planes straddling the shafts to pass a reel for placement on or removal from first hub.

2. In a tape recorder having coaxial hubs to receive and carry reels having openings of like diameter, the hubs being mounted on coaxial shafts, the improvement comprising an upper hub having a central generally rectangular base portion carried by the inner shaft and of substantially less extent than the openings of the reels, pins in said base portion straddling said inner shaft and located in a common plane normal to said inner shaft, and extending outboard the base portion, and a pair of wings each having an inner portion fitting around at least a portion of said base portion and pivotally received upon said projecting pins for folding rotations to up positions in planes straddling but parallel to said inner shaft and down positions in a plane normal to said shaft, each wing further having an outer edge forming in the down position a fragment of a cylinder adapted to receive the opening of a reel and a flange below said fragment of a cylinder adapted to sustain the reel, and in up position passing the opening of a reel.

3. In a tape recorder having coaxial hubs to receive and carry reels having openings of like diameter, the hubs being mounted on coaxial shafts, the improvement comprising an upper hub having a central generally rectangular base portion carried by the inner shaft and of substantially less extent than the openings of the reels, pins in and projecting from said base portion straddling said inner shaft and located in a common plane normal to said inner shaft, and a pair of wings each having an inner portion fitting around a portion of said base portion and pivotally received upon said pins for folding rotations to up positions in planes straddling but parallel to said inner shaft and down positions in a plane normal to said shaft, each wing further having an outer edge forming in the down position a fragment of a cylinder adapted to receive the opening of a reel and a flange below said fragment of a cylinder adapted to sustain the reel, and in up position passing the opening of a reel, and radially movable clamp elements on said base portion to hold a reel snugly down on said upper hub, thereby holding the same with the wings in down position.

References Cited in the file of this patent

UNITED STATES PATENTS

| | | |
|---|---|---|
| 1,023,419 | Dewey | Apr. 16, 1912 |
| 1,201,863 | Orey | Oct. 17, 1916 |
| 2,321,812 | Heller et al. | June 15, 1943 |
| 2,526,051 | Shrader | Oct. 17, 1950 |
| 2,576,459 | Holzman | Nov. 27, 1951 |
| 2,594,246 | Ten Cate | Apr. 22, 1952 |
| 2,616,705 | Leonard | Nov. 4, 1952 |
| 2,621,933 | Fordeck | Dec. 16, 1952 |
| 2,689,735 | Morrison | Sept. 21, 1954 |